(No Model.)
C. R. JOUVE.
CALCULATING RULER.
No. 571,567. Patented Nov. 17, 1896.
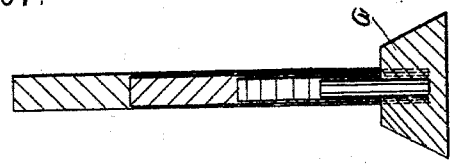
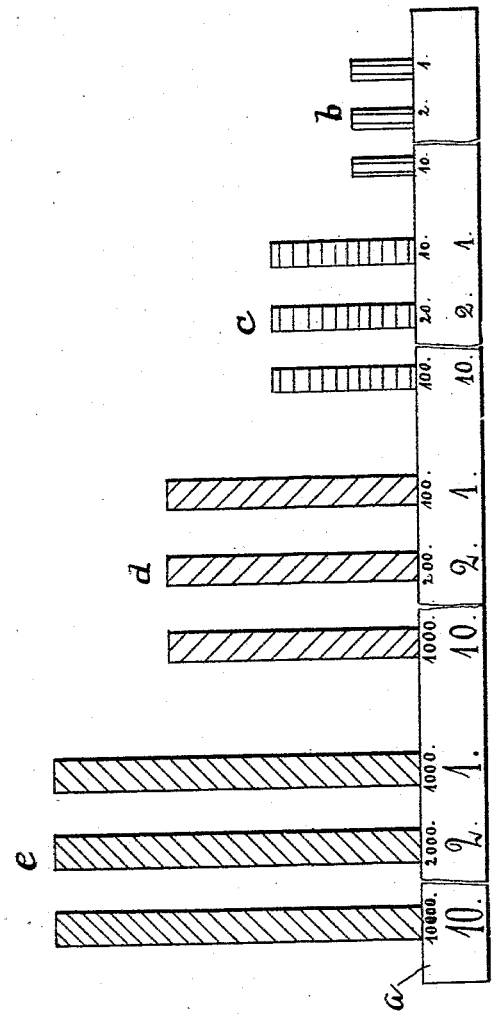
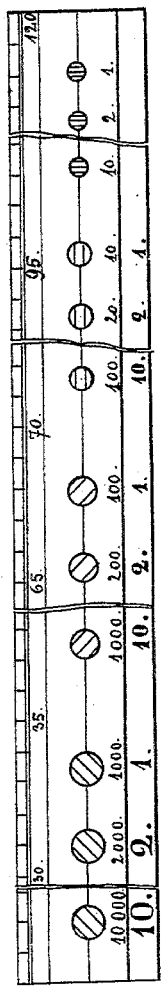
Witnesses:
Jas. A. Richmond
H. N. Jenkins
Inventor
Casimir R. Jouve
by G. Ittman,
Attorney.

UNITED STATES PATENT OFFICE.

CASIMIR ROGER JOUVE, OF DAX, FRANCE.

CALCULATING-RULER.

SPECIFICATION forming part of Letters Patent No. 571,567, dated November 17, 1896.

Application filed February 19, 1896. Serial No. 579,925. (No model.)

*To all whom it may concern:*

Be it known that I, CASIMIR ROGER JOUVE, a citizen of the French Republic, residing at Dax, in the Department of Landes, France, have invented certain new and useful Improvements in Calculating-Rulers, of which the following is a specification.

The object of the present invention is a simple apparatus adapted to explain clearly to children in a school the enumeration and the decomposition of numbers up to ten thousand; to give them the first notion of addition and subtraction, multiplication and division; to make them familiar to count by memory, &c.

This apparatus is shown in the accompanying drawings, in Figure 1, in side elevation. Fig. 2 is a plan view, and Fig. 3 a cross-section.

It consists in a ruler of trapezoidal section $a$, having any desired dimension, for instance, a length of one hundred and twenty centimeters, a width at the base of six centimeters, a width at top of three centimeters, and a height of three centimeters.

The ruler is divided in four equal parts from right to left in the sense of writing numerals. These parts are provided on the top of the ruler with four series of ten holes each, the first series being that of the units, the second that of the tens, the third that of the hundreds, and the fourth that of the thousands. These holes have for each series from right to left a diameter which increases, for instance, being six millimeters for the units, eight millimeters for the tens, ten millimeters for the hundreds, and twelve millimeters for the thousands, the depth of the holes being uniform of twenty-five millimeters each. Under each hole on the part of the units from right to left the numerals "1" "2" "3" "4" "5" "6" "7" "8" "9" "10" are written or engraved. These numerals represent the units. For better distinction the word "units" may be also printed in big letters on the side of the ruler in the middle of the part of units.

The series of holes of the tens, hundreds, and thousands are numbered and indicated in a similar manner, *i. e.*, "10," "20," "30," to "100" on the part of the tens, "100," "200," "300," to "1,000" on the part of the hundreds, and "1,000," "2,000," "3,000," &c., to "10,000" on the part of the thousands. Under these numerals, near the base of the ruler, the numbers "1" to "10" are engraved on each part, but the numerals increase correspondingly in dimensions, as clearly shown in Figs. 1 and 2. All these designations are on one of the inclined surfaces of the block. The other surface is divided equally in centimeters, so that the ruler can always form an exact centric measure. Each hole is provided with a stick varying in thickness, length, and also in color according to the four series of holes. These sticks fit in the holes with slight friction. The thinnest and shortest sticks $b$ indicate the units, the next size $c$ the tens. The sticks $d$ represent the hundreds and the sticks $e$ the thousands.

By taking out the sticks or by displacing them the reading of numbers can be practiced. For instance, if the teacher sets a stick $e$ in the hole 2, a stick $d$ in hole 1, a stick $c$ in hole 8, and a stick $b$ in hole 2 the children will read "2,182."

The first notion of multiplication may be given by placing sticks in the holes in any of the four sections from "1" to a certain number, say, from "1" to "4," in section of sticks $d$. The children will read immediately four times "100" is "400," &c. It will be easily understood by teachers without any further explanation here to practice division and subtraction in a similar manner.

The apparatus can be placed before the class in two manners. First, it may be suspended from two hooks in the middle of the blackboard parallel to the base of the same, or, secondly, it may be placed horizontally on the table, resting on its wider base.

It is obvious that the length of the ruler can be increased, and the sections may be continued to millions or any higher numbers.

Having thus described my invention, I claim as new and desire to secure by Letters Patent—

1. A ruler divided into sections, each provided with ten holes of equal diameter for each section, but increasing in diameter from section to section, being smallest in the section to the right and largest in the section to the left, said holes being adapted to receive with slight friction, sticks of different diameter to fit said holes, and having a different length, the sticks in the section to the right, representing the units, being the shortest and thinnest but equal to each other and the sticks in the section to the left representing the thousands, being the thickest and the longest, also equal to each other.

2. A ruler divided into sections, each provided with ten holes adapted to receive with slight friction, sticks of different length, different diameter and different color, being equal in each section, said ruler having numerals, engraved in front of the holes from "1" to "10" in the section of the units, from "10" to "100" in the section of the tens, from "100" to "1,000" in the section of the hundreds, &c., substantially as described.

3. A ruler divided into sections, each provided with ten holes adapted to receive with slight friction, sticks of different length, different diameter and different color, being equal in each section, said ruler having numerals engraved in front of the holes, from "1" to "10" in the section of the units, from "10" to "100" in the section of the tens, from "100" to "1,000" in the section of the hundreds, &c., and having in the section of the tens the numerals "1" to "10" marked or engraved at the base of the ruler in prominent size, and in the next section having the numerals "1" to "10" engraved under the numerals from "100" to "1,000" in still more prominent size, &c., substantially as described and for the purpose set forth.

In testimony whereof I have signed my name to this specification in the presence of two subscribing witnesses.

CASIMIR ROGER JOUVE.

Witnesses:
LOUIS S. FRAISSE,
EMILE PULXYET.